May 7, 1963     B. J. PATTON ET AL     3,088,528
MAGNETIC ORIENTATION OF SAMPLES OF EARTH MATERIAL
Filed Dec. 22, 1960     2 Sheets-Sheet 1

May 7, 1963    B. J. PATTON ET AL    3,088,528
MAGNETIC ORIENTATION OF SAMPLES OF EARTH MATERIAL
Filed Dec. 22, 1960    2 Sheets-Sheet 2

United States Patent Office

3,088,528
Patented May 7, 1963

3,088,528
MAGNETIC ORIENTATION OF SAMPLES
OF EARTH MATERIAL
Bob J. Patton and John L. Fitch, Dallas, Tex., assignors to Socony Mobil Oil Company, Inc., a corporation of New York
Filed Dec. 22, 1960, Ser. No. 77,545
14 Claims. (Cl. 175—44)

This invention relates to the taking of samples of material from the earth and relates more particularly to means for magnetically orienting the samples of earth material with respect to their original position in the earth.

Samples of material are taken from the earth for various purposes. For example, samples of material are taken from the earth in order to obtain information concerning the chemical or physical characteristics of the earth material at the point of sampling. These characteristics of the earth materials can be anisotropic. In many instances, the information desired requires a knowledge of the spatial position, or orientation, which the sample had in the earth.

Knowledge as to the orientation of earth samples which are to be studied in order to determine characteristics of the earth material is particularly important in the exploration for and production of petroleum oil and gas. In exploration for and production of petroleum oil and gas, samples of earth material are taken ordinarily by means of a core drill and the samples obtained are in the form of cylinders or cores. Much more useful information can be obtained from oriented cores than from those which are not oriented. For example, information to be obtained from study of the core may concern the dip and strike of the bedding planes in the strata from which the core was taken. Other information may concern the directional trends of rock fabric or the directional trends of the permeability of the strata to the flow of fluid. In each of these instances, knowledge of the orientation of the core is essential.

Various methods have been proposed to determine the orientation of the cores. Mechanical methods involving marking of the core are usually time consuming and, at best, mark only the top portion of the core which is of limited utility in the event the core becomes broken during recovery. Magnetic methods are generally favored over mechanical methods. One such method involves determination of the direction of the natural magnetism of the earth material. Another involves introduction of particles of a magnetic material into the pore spaces of the earth material which align themselves in the earth's magnetic field and, thereafter, measurement of the direction of the magnetic field of the aligned particles in the core. Still another involves imparting a magnetization to the earth material by artificial means. In this method, a steady magnetic field of known direction is imposed upon the earth material. The field imposes upon the earth material a remanent magnetism whose direction can be determined in the core after it has been taken from the earth.

The magnetic methods heretofore employed are subject to various drawbacks. For example, determination of the direction of the natural remanent magnetism of the earth material is difficult to achieve with accuracy because of the weakness of the natural magnetism. But more important, the direction of the natural remanent magnetism of the earth formations is not adequately determinable at present. Introduction of magnetic particles into the earth material affects only the top portion of the core and is thereby subject to the same objections as mechanical marking. Further, the procedure is unduly time consuming. The method involving imposition of a steady magnetic field of known direction is effective but requires a large battery supply, a separate step of surveying the inclination and orientation of the coring tool, and stoppage of the coring tool during imposition of the magnetic field.

It is an object of this invention to orient an earth sample with respect to its position in the earth. It is another object of this invention to improve the accuracy of orientation of an earth sample. It is another object of this invention to magnetize an earth sample in a known direction. It is another object of this invention to permit coring for recovery of a sample of earth material simultaneously with imposition of a magnetization of known direction upon the sample. It is another object of this invention to simplify the procedure of orientating an earth sample. These and other objects of the invention will become apparent from the following detailed description.

In accordance with the invention, an earth sample is marked in situ by imposing upon it, while it is subject to the earth's magnetic field, an alternating magnetic field.

Our invention is based upon effecting anhysteretic remanent magnetization of the earth sample in situ. Anhysteretic magnetization involves imposing upon a ferromagnetic substance a steady magnetic field simultaneously with an alternating magnetic field. The steady magnetic field may be of relatively low intensity. As a result of the simultaneous imposition of the alternating magnetic field, the effect of the steady magnetic field on the remanent magnetism imparted to the sample is greatly enhanced. For example, it has been shown that the remanent magnetism imparted by anhysteretic magnetization in a steady field of one oersted employing an alternating field of 1000 oersteds can be 10,000 times greater than the remanent magnetism imparted by the steady magnetic field alone. Further, the coercive force of the remanent magnetism imparted by the steady magnetic field is increased and will be a function of the magnitude of the alternating magnetic field and the steady magnetic field. Additionally, and of prime importance, the direction of the remanent magnetism will depend solely on the direction of the steady magnetic field.

Earth material, particularly rock, contains ferromagnetic substances such as a mineral exemplified by magnetite. Further, the earth material is subject to the earth's magnetic field. This magnetic field is a steady magnetic field and its direction is readily determinable. Thus, by imposing upon the earth material in situ an alternating magnetic field, a remanent magnetism is created within the earth material whose direction is precisely that of the earth's magnetic field and whose magnitude is a function of the magnitude of the imposed alternating magnetic field.

The direction of the earth's magnetic field is readily ascertainable. Because of its intensity, the induced anhysteretic remanent magnetism of a sample of the earth material, after removal from the earth, is also readily ascertainable. The direction of the magnetic field of the earth and the direction of the anhysteretic remanent magnetization of the sample in situ will be the same. Thus, the orientation of the earth sample becomes known.

In the practice of the invention, various means can be employed for imposing the alternating magnetic field upon the earth material in situ. For example, the alternating magnetic field may be imposed upon the earth material by means of a suitable magnetic device associated with the sampling tool. More specifically, the sampling tool may be provided with a magnet or magnets which will impose the alternating magnetic field upon the earth material. This magnet, or magnets, may be attached to the coring tool and, as the coring tool rotates, the field of the magnet or magnets will rotate and thus will change cyclically with respect to the earth's magnetic field. In this case, a magnetic field is imposed upon the earth material which is cyclically changed with respect to the earth's magnetic field and whose integrated value at any one point in the sample is substantially zero. The magnets may be permanent magnets or may be electromagnets. Where electromagnets are employed, the power for operation of the magnets may be battery supplied or supplied from a mechanically operated generator. Further, the battery or generator means employed may be located at the surface of the earth, within or adjacent to the coring tool, or elsewhere. On the other hand, the means for imposing the alternating magnetic field upon the earth in situ may be separate and distinct from the coring tool.

Figures 1, 3, 6, 9:
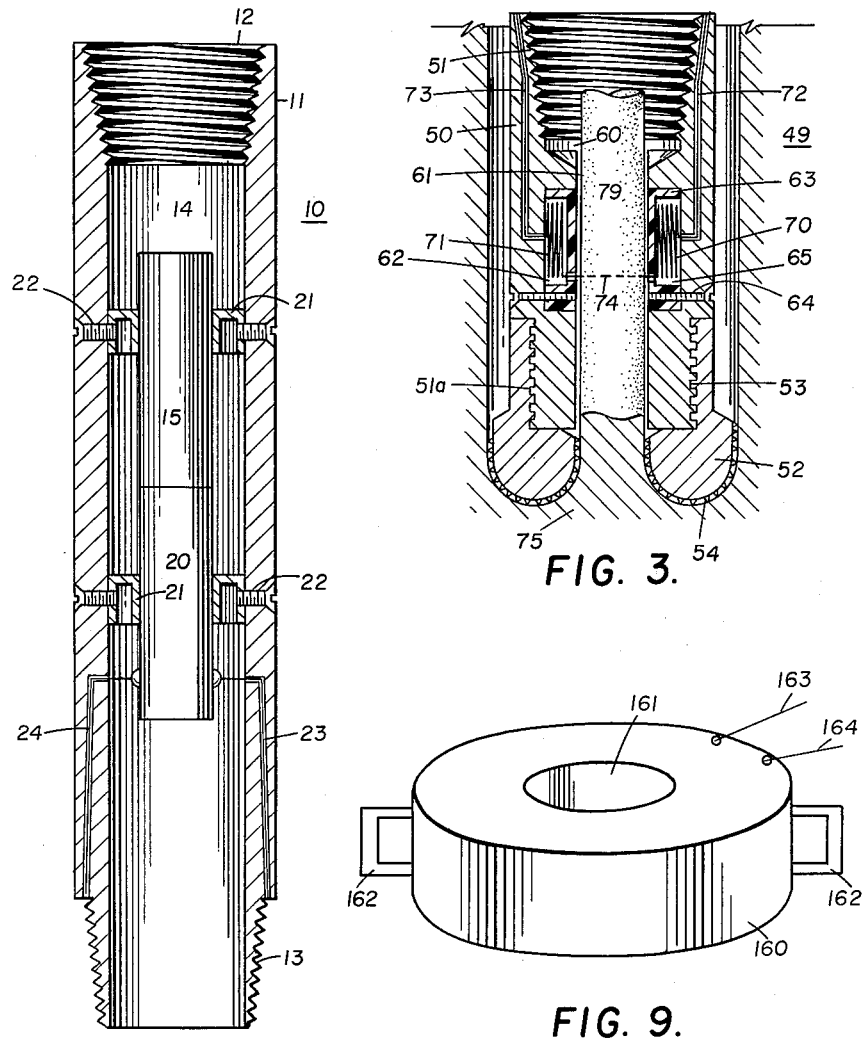
FIGURE 1 is a vertical section through a portion of a core drilling tool containing a generator of electrical current.
FIGURE 3 is a vertical section through another portion of a core drilling tool containing a core drilling bit and electromagnets.
FIGURE 6 is a schematic diagram illustrating an alternator.
FIGURE 9 is a view in perspective of a magnetizer.

Referring now to FIGURE 1, the portion 10 of the tool is provided with an outer casing 11 provided at one end with internal threads 12 and at the other end with external threads 13. Conduit 14 extends the entire length of the casing 11. Mounted within the conduit 14 is turbine 15 and connected thereto is a generator 20 of electrical current. Mounting of the turbine 15 and the generator 20 is effected by means of spiders 21 welded or otherwise connected to the turbine or the generator, respectively. The spiders 21 are fixed to the casing 11 by screws 22. Insulated electrical conductors 23 and 24 lead from generator 20 longitudinally through the walls of casing 11.

Figure 2:
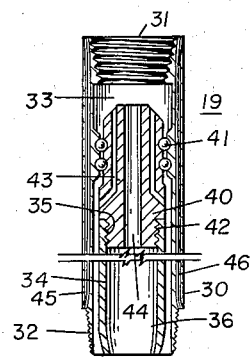
FIGURE 2 is a vertical section through another portion of a core drilling tool containing a swivel for a core catcher.

Another portion 19 of the core drilling tool, referring to FIGURE 2, is provided with outer casing 30. One end of the casing 30 is provided with internal threads 31 adapted to cooperate with external threads 13 of casing 11. The other end of casing 30 is provided with external threads 32. Extending throughout the length of casing 30 is conduit 33. Inside the conduit 33, and radially spaced therein from the inner walls of the casing 30, is core barrel 34. The core barrel 34 is provided with internal threads 35 and a conduit 36 for receiving a core. Mandrel 40 is rotatably mounted inside casing 30 on ball bearings 41 and is provided with external threads 42 to cooperate with threads 35 on core barrel 34. Passages 43 extend through the mandrel 40 and passage 44 extends throughout the entire length of the mandrel. Insulated electrical conductors 45 and 46 extend longitudinally throughout the length of the walls of the casing 30.

The third portion 49 of the core drilling tool, referring to FIGURE 3, is provided with casing 50. The casing 50 is constructed of material which is nonmagnetic. Preferably, also, this material is nonconducting to electrical current. The casing 50 is provided at one end with internal threads 51 adapted to cooperate with threads 32 of casing 30. The other end of casing 50 is provided with external threads 51a. Bit 52 provided with internal threads 53, adapted to cooperate with threads 51a on casing 50, is mounted on the casing 50. Bit 52 is nonmagnetic, but otherwise conventional, and is provided externally with cutting elements 54. Extending throughout the length of the casing 50 is a conduit for receiving a core. The conduit in casing 50 consists of a broad portion 60, a narrow portion 61, and another broad portion 62. Positioned within the portion 62 is sleeve 63 connected to the casing 50 by means of screws 64. The sleeve 63 is made of a material which is nonmagnetic. Preferably, also, this material is nonconducting to electrical current. The sleeve 63 has an internal diameter greater than the internal diameter of the core bit 52 and is shaped so as to provide a chamber 65 within the portion 62 of the conduit in casing 50. Positioned within the chamber 65 are a pair of electromagnets 70 and 71. Each of these magnets, as shown, are air core electromagnets. The electromagnets, as shown, are positioned with respect to the tool such that their axes are normal to the axis of the coring tool and their polarities are such that the fields are aiding. Conductors 72 and 73 lead through the casing 50 and are connected to electromagnets 70 and 71, respectively. Insulated conductor 74 connects electromagnets 70 and 71.

In operation, the three portions of the coring tool are connected together at their threaded ends and the assembly is connected by the threaded portion 12 of casing 11 at the bottom of a drill string. The conductors 23, 46, and 72 connect with each other and the conductors 24, 45, and 73 connect with each other. The drill string with the coring tool connected is lowered to the bottom of a well and rotation of the drill string and the coring tool are effected. Referring again to FIGURE 3, rotation of the core bit 52 effects coring of earth formation 75. As the bit penetrates the formation, a core 79 is formed and with movement of the tool into the formation the core enters the sleeve 63 and into the conduit in casing 50. With further movement of the bit, the core enters the core barrel 34 where it is retained. During this operation of drilling the core, anhysteretic remanent magnetization of the core is carried out.

During the coring operation, drilling fluid is constantly circulated downwardly through the drill string and the drilling fluid enters into the coring tool. The drilling fluid passes through the conduit 14 and through the turbine 15. A portion of the drilling fluid then passes through conduits 43 in mandrel 40 and the remainder passes through the conduit 44 into the core conduit in casing 50. With passage of the drilling fluid through the turbine, operation of the generator 20 is effected. The electrical current from the generator passes through the conductors 23, 46, and 72 to electromagnet 70. Thence, the current flows through conductor 74 to electromagnet 71 and thence through the conductors 73, 45, and 24 to the generator. With flow of electrical current through the electromagnets 70 and 71, these are activated to produce upon the core 79 a magnetic field. The mandrel 40 suspended within the casing 30 remains stationary with the result that the core barrel also remains stationary. On the other hand, the electromagnets 70 and 71 rotate about the core 79 with rotation of the bit 52. As a result, the magnetic field rotates about the core sample. Effectively, with rotation of the magnetic field, an alternating magnetic field is imposed upon the core throughout the core drilling operation. During this time, the core is subjected to the action of the earth's magnetic field. With the casing 50, bit 52, and the sleeve 63 made of a nonmagnetic and preferably electrically nonconducting material, there is no distortion of the earth's magnetic field upon the core. Rotation of the electromagnets causes a cyclic change in the induced electromagnetic field with respect to the direction of the earth's magnetic field. With rotation of the magnets, further, the integrated value of the induced magnetic field at any one point in the core sample will be substantially zero. Thus, as stated previously, a remanent magnetism will be imparted to the core sample whose direction will be equal to that of the magnetic field of the earth.

Figure 8:
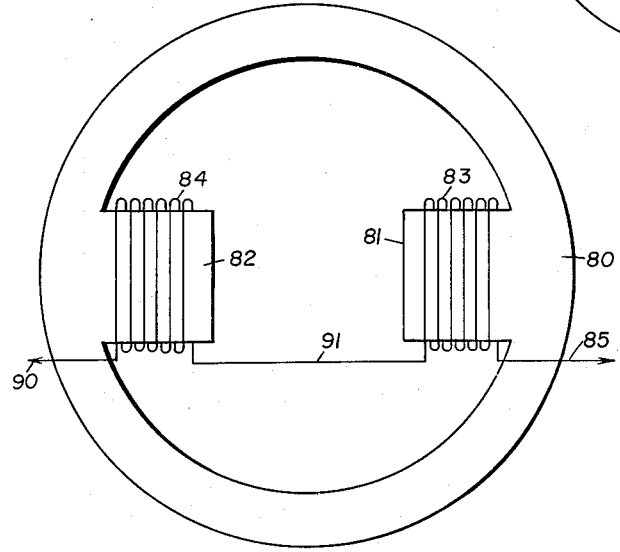
FIGURE 8 is a plan view of a ferromagnetic yoke core for an electromagnet.

While the electromagnets 70 and 71 have been described as having air cores, it will be understood that the electromagnets which may be employed are not restricted to this type. For example, ferromagnetic core electromagnets may be employed in the coring tool. A ferromagnetic core electromagnet, such as the one shown in FIGURE 8, may be employed. Referring to FIGURE 8, the ferromagnetic yoke electromagnet comprises yoke 80 and pole pieces 81 and 82. Around pole pieces 81 and 82 are wound coils 83 and 84, respectively. Conductor 85 leads to coil 83 and conductor 90 leads to coil 84. Conductor 91 connects the two coils. The electromagnet is positioned within the broad portion 62 of the casing 50 and conductor 85 is connected to conductor 72 and conductor 90 is connected to conductor 73.

As indicated, rotation of the electromagnets, upon rotation of the core bit, imposes an alternating magnetic field upon the core 79. Where electromagnets are employed, however, it is not essential that they be rotated in order to impose an alternating magnetic field on the core. Rather, an alternating electrical current can be supplied to the electromagnets and the magnetic field produced will be an alternating magnetic field. Thus, where the current supplied to the electromagnets is alternating current, an alternating magnetic field will be imposed upon the core regardless of rotation of the electromagnets. Where an alternating electrical current is supplied to the electromagnets and the electromagnets are rotated, all components of the magnetic field integrate to zero.

Alternating current will be supplied to the electromagnets where generator 20 is a generator of alternating current. On the other hand, generator 20 may be a generator of direct current. In this case, the current supplied by the generator can be converted to alternating current where it is desired to obtain the enhanced effect of the alternating magnetic fields provided by supply of alternating current to the electromagnets and rotation of the electromagnets. An alternator for converting direct current to alternating can be positioned within the coring tool, as, for example, within or adjacent to the housing of the generator 20. A suitable type of alternator comprises a motor operating a contact arm over a loop resistor. Referring to FIGURE 6, conductors 100 and 101 lead from terminals 102 and 103, respectively, to the output of the direct current generator. The conductors lead to loop resistor 104 at points 180° apart from each other. Conductor 105 leads from the loop resistor to one side of coil 110 representing the coils of the electromagnets. Conductor 111 leads to the other side of coil 110 from sliding contactor 112. The sliding contactor 112 is operated to rotate about the loop resistor 104 by rotation of shaft 113 and shaft 113 is rotated by motor 114. The motor 114 may be mechanically operated or may be electrically operated. Where the motor is electrically operated, power for this purpose can be supplied through conductors 115 and 116 connected to conductors 100 and 101, respectively.

Figure 7:
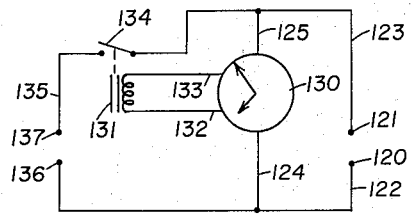
FIGURE 7 is a schematic diagram illustrating a controlling device.

Power for operation of electromagnets may also be supplied by means of batteries. Where power is supplied from this source, a container for the battery may be substituted within the coring tool for the turbine 15 and the generator 20. The alternating magnetic field may be imposed upon the core solely by rotation of the electromagnets. On the other hand, the current from the batteries can also be converted into alternating current to obtain the enhanced effect of the alternating field being supplied by alternation of the electrical current in addition to that imparted by rotation of the electromagnets. An alternator for this purpose may be of the same construction as the alternator described in connection with FIGURE 6.

Where batteries are employed as the source of electrical current for operation of the electromagnets, it is desirable, in order to conserve the batteries, that electrical current be supplied to the electromagnets only at such times that imposition of the magnetic field on the core is to be effected. Further, it is not essential that the anhysteretic remanent magnetism be imparted to the entire length of the core. Thus, the remanent magnetism can be imparted to a portion only, or portions at intervals, of the core. Turning off the current at intervals allows recovery of some portions of the core with undisturbed natural remanent magnetism which is of advantage in studies not connected with core orientation. Control of the times that electrical current is to be supplied to the electromagnets may be obtained with a timing device. The timing device can be placed within or adjacent to the container for the batteries within the core drilling tool. FIGURE 7 illustrates a circuit diagram of such a timing device.

Referring to FIGURE 7, terminals 120 and 121 are connected to conductors 122 and 123, respectively. Terminals 120 and 121 are connected to the batteries. Connected to conductor 122 is conductor 124 and connected to conductor 123 is conductor 125. Conductors 124 and 125 each lead to clock 130. Leading from clock 130 to solenoid 131 are conductors 132 and 133. Solenoid 131 operates switch 134 connected at one side to conductor 123. Conductor 135 is connected to the other side of switch 134. Conductors 122 and 135 lead to terminals 136 and 137, respectively, and the terminals 136 and 137 are connected to the electromagnets. Operation of clock 130 effects connection of conductors 124 and 125 to conductors 132 and 133, respectively, whereby operation of solenoid 131 and switch 134 are effected. Clock 130 is set prior to the beginning of core drilling operations such that for a desired time or for a desired series of times during the core drilling operation electrical current is passed from the batteries to the electromagnets. When the clock connects conductors 124 and 125 to conductors 132 and 133, respectively, electrical current passes through solenoid 131 and the solenoid therefore acts to close switch 134. With switch 134 closed, electrical current passes from terminals 120 and 121 connected to the batteries to the terminals 136 and 137, respectively, connected to the electromagnets. When clock 130 disconnects the conductors, solenoid 131 operates to open switch 134 and electrical current no longer passes to the electromagnets. The clock 130 can be mechanically operated or may be electrically operated. While the timing device has been described in connection with the use of batteries for supplying electrical current to the electromagnets, it may also be used where a generator or other power source is employed for supplying electrical current to the coils.

In place of the electromagnets, permanent magnets may be employed. In this case, the alternating magnetic field is applied to the core solely by rotation of the magnets. Where permanent magnets are employed, the generator section 10 of the coring tool can be eliminated and to use the tool the drill pipe can be connected directly to the casing 30 of the swivel section 19 of the tool. The permanent magnets will be substituted for the air core magnets 70 and 71 or the ferromagnetic yoke electromagnet 80 or other type of electromagnet employed. Similarly to the electromagnets, the permanent magnets are positioned with respect to the tool such that their axes are normal to the axis of the coring tool and their polarities are such as to produce a maximum field as shown in FIGURE 4.

Rotation of the magnets along an axis normal to their own axis will make the vertical components of the magnetic field alternating. These components will also tend to cancel each other. All of these components will integrate substantially to zero, thus eliminating any undesired magnetization. Means for effecting rotation of the magnets about their own axes are illustrated schematically in FIGURES 4 and 5.

Figure 4:
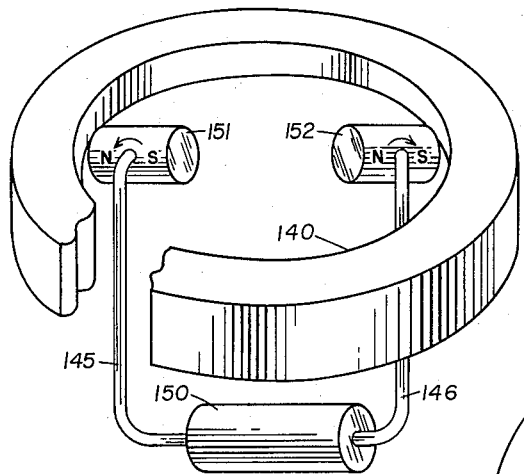
FIGURE 4 is a view in perspective, partially broken, of a means for positioning permanent magnets within a core drilling bit.
Figure 5:
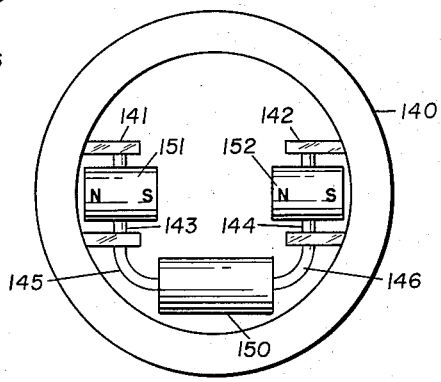
FIGURE 5 is a plan view of the means illustrated in FIGURE 4.

Referring to FIGURES 4 and 5, support ring 140 is adapted to be positioned within the broad portion 62 of the conduit in casing 50 in the bit portion 49 of the coring tool. Attached to the ring 140 are two pairs of shaft supports 141 and 142. Rotatable shaft 143 is supported between the shaft supports 141 and rotatable shaft 144 is supported between the shaft supports 142. Drive shaft 145 is connected to shaft 143 and drive shaft 146 is connected to shaft 144. Each of drive shafts 145 and 146 is connected to fluid-actuated turbine 150. An electric motor or other drive mechanism may be substituted for the turbine 150. Suitable mounting means, not shown, may be provided to support the drive mechanism. Mounted on shaft 143 is permanent magnet 151 and mounted on the shaft 144 is permanent magnet 152. Passage of drilling fluid through the coring tool during the coring operation actuates turbines 150. Action of the turbine is imparted to the magnets 151 and 152 through the drive shafts to rotate the magnets about the shafts 143 and 144, respectively, in opposite directions. Additionally, the magnets are mounted on the shafts, as shown, such that the opposite poles of the magnets face each other. Thus, during rotation, the horizontal field components from the magnets will aid each other and the vertical components will tend to cancel each other.

Particular reference has been made in the foregoing description to imparting anhysteretic remanent magnetism to earth samples where the means for imparting the magnetism are associated with a sampling tool. These means are useful particularly, but not exclusively, where the sample is to be taken from the earth at a location remote from the surface. For example, these means, as mentioned previously, are useful where the sample is to be taken at the bottom of a well borehole. However, as also mentioned previously, the means for imposing the alternating magnetic field can be separate from the coring tool. Such means are more readily and conveniently employed, although not exclusively, so, where the sample is to be taken from a position at, or near, the surface of the earth. Means for effecting anhysteretic remanent magnetism to an earth sample not associated with the sampling tool are schematically illustrated in FIGURE 9. The device illustrated in FIGURE 9 comprises a case 160 having a center opening 161. Positioned on the case in a pair of handles 162. The case contains interiorly a coil, not shown, and the coil is supplied with alternating electrical current through conductors 163 and 164. Passage of alternating electrical current through the coil creates an alternating magnetic field, particularly in the area above and below the opening in the case. In operation, case 160 is placed upon the earth's surface where the sample is to be taken, with the opening 161 close to the point where the sample is to be taken. Alternating electrical current is passed through the coil through the conductors 163 and 164. Thereafter, the case is removed from its location and the sample is taken from the earth by coring, or otherwise.

In imposing anhysteretic remanent magnetism to an earth sample, it is preferred, after subjecting the earth sample to the alternating magnetic field, to reduce the alternating field to zero relatively smoothly and continuously. This is for the purpose of avoiding the imposition of weak secondary anhysteretic remanent magnetism. Removal of the magnetic field, with the device described above, can be effected simply by continuously decreasing the supply of electrical current to the conductors 163 and 164. For this purpose, a variable auto transformer may be employed. Conversely, the coil may be slowly removed from its location before interrupting the supply of alternating electrical current.

While the apparatus of FIGURE 9 has been described for use in imparting anhysteretic remanent magnetism to an earth sample at or near the surface of the earth, other means therefor can be employed. For example, a magnet, or plurality of magnets, may be rotated in the vicinity of the earth where the sample is to be taken. The magnets may be permanent magnets or may be electromagnets. Rotation thereof can be effected by any suitable means such as a crank arrangement or by electrical power obtained from any suitable source such as an automobile battery.

Following removal of the sample from the earth, the direction of the magnetization of the sample is determined. This may be done immediately or may be done at any time thereafter. For determining the direction of the magnetization, any type of magnetometer may be employed. The direction of the anhysteretic remanent magnetism will be the same as that of the earth's magnetic field. The geographic direction of the earth's magnetic field at the sampling location is readily obtainable by standard procedures. The geographic orientation of the same is obtained by determining the anhysteretic remanent magnetization of the sample and correlating this magnetization with the geographic direction of the earth's field.

As described above, the earth's magnetic field alone is employed to establish the direction of the anhysteretic magnetization of the earth sample. However, it is possible, if desired, to aid or enhance the earth's magnetic field by an auxiliary magnetic field. This auxiliary magnetic field must be in the same direction as the earth's magnetic field. Various means for orienting the auxiliary field with the earth's magnetic field may be employed. For example, the auxiliary field may be provided by a coil carrying a current which coil is oriented by the method described in U.S. Patent 2,766,426. Alternatively, the coil may remain fixed to the coring device and be energized only when aligned with the earth's magnetic field. Also, the coil, if allowed to rotate freely, will while carrying a current automatically align itself with the earth's magnetic field.

Having thus described our invention, it will be understood that such description has been given by way of illustration and example and not by way of limitation, reference for the latter purpose being had to the appended claims.

We claim:

1. In a method of taking a sample from the earth the steps whereby the orientation of said sample with respect to its position in the earth may be determined comprising subjecting earth material in situ from which said sample is to be taken to an alternating magnetic field while said earth material is subject to the magnetic field of the earth, said alternating magnetic field having sufficient strength relative to the magnetic field of the earth to impart anhysteretic remanent magnetism to said earth material, whereby anhysteretic remanent magnetism is imparted to said earth material and said magnetism has a direction equal to that of the magnetic field of the earth, and thereafter removing said sample from the earth.

2. In a method of taking and orienting a sample from the earth the steps comprising subjecting earth material in situ from which said sample is to be taken to an alternating magnetic field while said earth material is subject to the magnetic field of the earth, said alternating magnetic field having sufficient strength relative to the magnetic field of the earth to impart anhysteretic remanent magnetism to said earth material, whereby anhysteretic remanent magnetism is imparted to said earth material and said magnetism has a direction equal to that of the magnetic field of the earth, thereafter removing said sample from its position in the earth, and then determining the direction of said anhysteretic remanent magnetism of said sample whereby the orientation said sample had in the earth becomes known.

3. In a method of taking and orienting a sample from the earth the steps comprising establishing within earth material in situ from which said sample is to be taken a magnetic field, alternating said magnetic field while said earth material is subject to the magnetic field of the earth, said magnetic field having sufficient strength relative to the magnetic field of the earth while being alternated to impart anhysteretic remanent magnetism to said earth material, whereby anhysteretic remanent magnetism is imparted to said earth material and said magnetism has a direction equal to that of magnetic field of the earth, thereafter removing said sample from its position in the earth, and then determining the direction of said anhysteretic remanent magnetism of said sample whereby the orientation said sample had in the earth becomes known.

4. In a method of taking and orienting a sample from the earth the steps comprising establishing within earth material in situ from which said sample is to be taken a magnetic field, rotating said magnetic field about said earth material while said earth material is subject to the magnetic field of the earth, said magnetic field having sufficient strength relative to the magnetic field of the earth while being rotated to impart anhysteretic remanent magnetism to said earth material, whereby anhysteretic remanent magnetism is imparted to said earth material and said magnetism has a direction equal to that of the magnetic field of the earth, thereafter removing said sample from its position in the earth, and then determining the direction of said anhysteretic remanent magnetism of said sample whereby the orientation of said sample had in the earth becomes known.

5. In a method of taking and orienting a sample from the earth the steps comprising establishing in earth material in situ from which said sample is to be taken a magnetic field, alternating said magnetic field and rotating said magnetic field about said earth material while said earth material is subject to the magnetic field of the earth, said magnetic field having sufficient strength relative to the magnetic field of the earth while being alternated and rotated to impart anhysteretic remanent magnetism to said earth material, whereby anhysteretic remanent magnetism is imparted to said earth material and said magnetism has a direction equal to that of the magnetic field of the earth, thereafter removing said sample from its position in the earth, and then determining the direction of said anhysteretic remanent magnetism of said sample whereby the orientation said sample had in the earth becomes known.

6. In a method of taking and orienting a sample from the earth the steps comprising imposing upon earth material in situ from which said sample is to be taken a steady magnetic field which has a direction equal to that of the magnetic field of the earth, subjecting said earth material in situ to an alternating magnetic field while said earth material is subject to said steady magnetic field, said alternating magnetic field having sufficient strength relative to said steady magnetic field to impart anhysteretic remanent magnetism to said earth material, whereby anhysteretic remanent magnetism is imparted to said earth material and said magnetism has a direction equal to that of the magnetic field of the earth, thereafter removing said sample from its position in the earth, and then determining the direction of said anhysteretic remanent magnetism of said sample whereby the orientation said sample had in the earth becomes known.

7. In a method of taking a sample from the earth the steps whereby the orientation of said sample with respect to its position in the earth may be determined comprising positioning a magnet adjacent to earth material in situ from which said sample is to be taken, actuating said magnet to produce an alternating magnetic field upon said earth material while said earth material is subject to the magnetic field of the earth, said alternating magnetic field having sufficient strength relative to the magnetic field of the earth to impart anhysteretic remanent magnetism to said earth material, whereby anhysteretic remanent magnetism is imparted to said earth material and said magnetism has a direction equal to that of the magnetic field of the earth, and upon determination of the direction of said anhysteretic remanent magnetism the orientation said sample had in the earth with respect to the direction of the magnetic field of the earth becomes known, and thereafter removing said sample from the earth.

8. The method of claim 7 wherein said magnet is a permanent magnet.

9. The method of claim 7 wherein said magnet is an electromagnet.

10. In a method of taking and orienting a sample from the earth the steps comprising positioning a magnet adjacent to earth material in situ from which said sample is to be taken, actuating said magnet to produce an alternating magnetic field upon said earth material while said earth material is subject to the magnetic field of the earth, said magnetic field while being alternated having sufficient strength relative to the magnetic field of the earth to impart anhysteretic remanent magnetism to said earth material, whereby anhysteretic remanent magnetism is imparted to said earth material and said magnetism has a direction equal to that of the magnetic field of the earth, and thereafter removing said sample from its position in the earth, whereby the orientation said sample had in the earth with respect to the direction of the magnetic field of the earth becomes known upon determination of the direction of said anhysteretic remanent magnetism of said sample.

11. In a method of taking and orienting a sample from the earth the steps comprising positioning a magnet adjacent to earth material in situ from which said sample is to be taken, alternating the field of said magnet to produce an alternating magnetic field upon said earth material while said earth material is subject to the magnetic field of the earth, said magnetic field while being alternated having sufficient strength relative to the magnetic field of the earth to impart anhysteretic remanent magnetism to said earth material, whereby anhysteretic remanent magnetism is imparted to said earth material and said magnetism has a direction equal to that of the magnetic field of the earth, and thereafter removing said sample from its position in the earth, whereby the orientation said sample had in the earth with respect to the direction of the magnetic field of the earth becomes known upon determination of the direction of said anhysteretic remanent magnetism of said sample.

12. In a method of taking and orienting a sample from the earth the steps comprising positioning a magnet adjacent to earth material in situ from which said sample is to be taken, rotating said magnet to produce an alternating magnetic field upon said earth material while said earth material is subject to the magnetic field of the earth, said magnetic field while being alternated having sufficient strength relative to the magnetic field of the earth to impart anhysteretic remanent magnetism to said earth material, whereby anhysteretic remanent magnetism is imparted to said earth material and said magnetism has a direction equal to that of the magnetic field of the earth, and thereafter removing said sample from its position in the earth, whereby the orientation said sample had in the earth with respect to the direction of the magnetic field of the earth becomes known upon determination of the direction of said anhysteretic remanent magnetism of said sample.

13. In a method of taking and orienting a sample from the earth the steps comprising positioning a magnet adjacent to earth material in situ from which said sample is to be taken, alternating the field of said magnet and rotating said magnet to produce an alternating magnetic field upon said earth material while said earth material is subject to the magnetic field of the earth, said magnetic field while being alternated having sufficient strength relative to the magnetic field of the earth to impart anhysteretic remanent magnetism to said earth material, whereby anhysteretic remanent magnetism is imparted to said earth material and said magnetism has a direction equal to that of the magnetic field of the earth, and thereafter removing said sample from its position in the earth, whereby the orientation said sample had in the earth with respect to the direction of the magnetic field of the earth becomes known upon determination of the direction of said anhysteretic remanent magnetism of said sample.

14. In a method of taking and orienting a sample from the earth the steps comprising positioning a first magnet adjacent to earth material in situ from which said sample is to be taken and actuating said magnet to produce a steady magnetic field upon said earth material which has a direction equal to that of the magnetic field of the earth, positioning a second magnet adjacent to said earth material in situ from which said sample is to be taken and actuating said second magnet to produce an alternating magnetic field upon said earth material while said earth material is subject to said steady magnetic field, said alternating magnetic field having sufficient strength relative to said steady magnetic field to impart anhysteretic remanent magnetism to said earth material, whereby anhysteretic remanent magnetism is imparted to said earth material and said magnetism has a direction equal to that of the magnetic field of the earth, and thereafter removing said sample from its position in the earth, whereby the orientation said sample had in the earth with respect to the direction of the magnetic field of the earth becomes known upon determination of the direction of said anhysteretic remanent magnetism of said sample.

References Cited in the file of this patent

UNITED STATES PATENTS

| | | |
|---|---|---|
| 2,140,097 | Vacquier | Dec. 13, 1938 |
| 2,203,730 | Johnson | June 11, 1940 |
| 2,292,838 | Jones | Aug. 11, 1942 |
| 2,709,069 | Boucher | May 24, 1955 |
| 2,735,652 | Brady | Feb. 21, 1956 |
| 2,820,610 | Martinez | Jan. 21, 1958 |